United States Patent Office 2,861,888
Patented Nov. 25, 1958

2,861,888
PELLETS CONTAINING DEHYDRATED MEAT AND COCONUT AND CONFECTION CONTAINING THESE PELLETS

Edward F. Coles and Thelma A. Coles, Prineville, Oreg.

No Drawing. Application August 14, 1956
Serial No. 603,859

9 Claims. (Cl. 99—125)

Our invention relates to a confection of high protein content. It also is directed to the production of finely divided particles or pellets of dehydrated meat and an oily vegetable material, which may be incorporated in candy, cookies, waffles, muffins and the like, to provide said high protein content and to give a pleasant and distinctive flavor to the products thus made.

Many people who are on diets are required, or desire, to limit their consumption of foods containing carbohydrates and to eat food that predominates in proteins, thus having candy, cookies, and other foodstuffs which have a high carbohydrate content, removed from their diet.

We have discovered that a product can be made in which a relatively large quantity of dried meat, such, for example, as dried beef, can be incorporated therein, which product can be given an appetizing and distinctive flavor by impregnating it with vegetable oil, such, for example, as the oily constituent of coconut meat. The impregnation of the meaty particles with said oily exudate causes the product to have greater keeping qualities, particularly if said intermixture and impregnation is produced by roasting or toasting said intermixture, and thereafter forming said intermixture into relatively small particles or pellets.

A further object of our invention is to produce a candy product which includes a large proportion of pellets of the intermixture thus formed, carried in a creamy base and sheathed and sealed in an edible coating.

A further object of our invention is to provide a confection in which said pellets and intermixture of finely divided, dehydrated meat and an oily vegetable material are incorporated in cookies, cakes, waffles, muffins, or other intermixtures and are dispersed therein.

We have determined that the intermixture of meat and an oily vegetable material may thus be accomplished by first drying meat, such, for example, as beef, and then grinding or otherwise comminuting it and intermixing it with grated or shredded coconut. The coconut and the meat are thus finely divided and, when thus intermixed, are toasted or roasted to a point where said products are substantially dehydrated. At this point, the ground meat takes on the flavor of the oily vegetable material, and the oily vegetable material impregnates the meat and gives it better keeping qualities. The intermixture has a distinctive, tasty, salty flavor which resembles neither meat nor coconut. We use approximately equal parts of dried beef, or other meat, and shredded coconut in said intermixture.

Thereafter, the intermixture, which has been toasted or roasted, is formed into pellets approximately ⅛ inch in diameter. Said pellets are compressed and do not have a tendency to fracture nor crumble. Said pellets are sufficiently palatable to be eaten without being incorporated in candy or confection form, or they may be used in connection with a candy base or a confection mix.

Although we feel that dried beef is the preferred meat to be used, we have determined that any lean meat may be incorporated in a product embodying our invention.

We have found that fat meat does not produce a product product which has good keeping qualities, and we thus utilize an oily vegetable material. Coconut is a preferred example thereof, but our invention is not limited thereto. Any oily vegetable material can be used which is capable of being incorporated in foodstuffs and which is palatable. We preferably use a vegetable material which is relatively bland and palatable and which does not have a high flavor factor. Examples of oily vegetable materials which have proved satisfactory are fruits and nuts, such, for example, as rinds of citrus fruits, peanuts, almonds, cashew nut, walnuts, pecans, and filberts. Intermixtures of nuts and fruits may also be used, and small quantities of essential oils may be incorporated in the pellets of flavoring material.

Some typical recipes incorporating said meat and oily vegetable material are:

Date cookies
½ cup shortening
½ cup sugar
2 tbsp. brown sugar
1 egg, beaten
1 cup sifted flour
1 tsp. baking powder
⅛ tsp. salt
½ cup quick-cooking oats
¾ cup chopped dates
½ cup meat and vegetable pellets
1 tsp. vanilla Combine in usual order. Drop on greased baking sheet and bake in moderately hot oven (375° F.) 12 to 15 minutes.

Butterscotch bars
¼ cup butter
1 cup brown sugar
1 egg, beaten
1 tsp. vanilla
½ cup bread flour
1 tsp. baking powder
⅛ tsp. salt
½ cup meat and vegetable pellets Melt butter in pan and add brown sugar. Stir until dissolved. Add beaten egg and vanilla. Add baking powder and salt to sifted flour and resift. Stir into butter mixture and add meat and vegetable pellets. Pour in greased 8 x 8 inch pan. Bake in moderate oven (350° F.) for about 30 minutes.

Banana cake
⅔ cup shortening
2½ cups sifted cake flour
1⅔ cups sugar
1¼ tsp. baking powder
1 tsp. soda
¼ tsp. salt
1¼ cups sieved bananas (about 3)
⅔ cup buttermilk
2 large eggs
½ cup meat and vegetable pellets
1 tsp. vanilla Stir shortening just to soften. Sift in dry ingredients. Add bananas and half the buttermilk. Mix until all flour is dampened. Then beat vigorously 2 minutes. Add remaining buttermilk, eggs, and vanilla and beat two minutes longer. Fold in meat and vegetable pellets. Bake in two greased 9 x 1½ inch round pans in moderate (350° F.) oven. Bake for 30 to 35 minutes. Frost as desired.

Waffles

1¾ cups sifted flour
3 tsp. baking powder
⅛ tsp. salt
2 beaten egg yolks
1¼ cups milk
½ cup salad oil
2 stiffly beaten egg whites Sift dry ingredients and stir in combined egg yolks, milk and shortening. Fold in egg whites. Sprinkle 2 tbsp. meat and vegetable pellets over batter before closing iron.

Muffins

1¾ cups sifted flour
2½ tsp. baking powder
2 tbsp. sugar
⅛ tsp. salt
1 well-beaten egg
¾ cup milk
⅓ cup shortening or salad oil
⅓ cup meat and vegetable pellets Sift dry ingredients in bowl, make a well in center and add milk, salad oil, and egg. Stir only until dry ingredients are moistened. Fold in meat and vegetable pellets. Fill muffin pans ¾ full and bake in hot oven (400° F.) for 25 minutes.

In the manufacture of candy, we intermix dried beef and shredded coconut formed as pellets in equal proportions with marshmallow or other creamy base. The intermixtures may be formed into spheres, cubes, wafers, or chips, and thereafter dipped in chocolate or other coating. Said coating and sheathing material serves also to seal out air and prevent the meaty particles from spoiling or rancidifying. In said intermixture, nuts, dates, raisins, and other materials may be intermixed and incorporated with said base. In confections, dates, nuts, chocolate chips, raisins, mixed fruits, coconut, mincemeat, and other standard cookie ingredients may be incorporated. The meat constituent has a slightly salty taste, and thus added salt may be reduced to a minimum, which is advantageous for those people requiring a salt-free diet.

It is not essential that the meat be first dehydrated and then ground and intermixed with the oily vegetable material. Fresh meat may be ground first and then dehydrated, although our experience has proved that it is better partially to dehydrate the meat before grinding it. After the meat and coconut have been intermixed and roasted, it is desirable that the intermixture be reground before it is formed into pellets. Any type of energy may be used to dry and thus preserve the meat, such, for example, as sun drying, heat drying, and drying over a smoky fire similar to the manner in which venison is jerked.

In using the term vegetable, we differentiate from animal and mineral sources, not as between vegetables and fruits, for example.

We claim:

1. An article of manufacture of high protein content comprising, pellets of finely divided dehydrated lean meat only and an oily vegetable material intimately intermixed therewith and subjected to dry heat to cause the oily content of the vegetable material to be exuded therefrom and to impregnate the meat.

2. An article of manufacture of high protein content comprising, pellets of finely divided dehydrated lean meat only and coconut intimately intermixed therewith and subjected to dry heat to cause the oily content of the coconut to be exuded therefrom and to impregnate the meat.

3. An article of manufacture of high protein content comprising, pellets of finely divided dehydrated lean meat only and an oily vegetable material intimately intermixed therewith and toasted to cause the oily content of the vegetable material to be exuded therefrom and to impregnate the meat.

4. A confection of high protein content comprising, pellets of finely divided dehydrated lean meat only and an oily vegetable material intimately intermixed therewith and subjected to dry heat to cause the oily content of the vegetable material to be exuded therefrom and to impregnate the meat, the pellets of meat and vegetable material being dispersed in a confection mix and cooked therewith.

5. A confection of high protein content comprising, pellets of finely divided dehydrated lean meat only and coconut intimately intermixed therewith and subjected to dry heat to cause the oily content of the coconut to be exuded therefrom and to impregnate the meat, said pellets of meat and coconut being dispersed in a confection mix and cooked therewith.

6. A candy product including, pellets of finely divided dehydrated lean meat only and an oily vegetable material intimately intermixed therewith and subjected to dry heat to cause the oily content of the vegetable material to be exuded therefrom and to impregnate the meat, said pellets of meat and vegetable material being carried in a creamy base.

7. A candy product including, pellets of finely divided dehydrated lean meat only and coconut intimately intermixed therewith and subjected to dry heat to cause the oily content of the coconut to be exuded therefrom and to impregnate the meat, said pellets of meat and coconut being carried in a marshmallow base, and being sheathed and sealed in an edible coating.

8. A candy product including, pellets of finely divided dehydrated lean meat only and coconut intimately intermixed therewith and toasted to cause the oily content of the coconut to be exuded therefrom and to impregnate the meat, said pellets of meat and coconut being carried in a creamy and sweetened base, and being sheathed and sealed in an edible coating.

9. A candy product including, pellets of finely divided dehydrated lean meat only and coconut intimately intermixed therewith and toasted to cause the oily content of the coconut to be exuded therefrom and to impregnate the meat, said pellets of meat and coconut being carried in a marshmallow base, and being sheathed in a chocolate coating.

References Cited in the file of this patent

UNITED STATES PATENTS

| Number | Name | Date |
|---|---|---|
| 95,715 | Munroe | Oct. 12, 1869 |
| 113,047 | Harbach et al. | Mar. 28, 1871 |
| 203,614 | Gunkel | May 14, 1878 |
| 456,903 | Ordway | July 28, 1891 |
| 2,272,990 | Forkner et al. | Feb. 10, 1942 |